United States Patent [19]

Lai et al.

[11] 4,106,440

[45] Aug. 15, 1978

[54] ELECTRONIC SPARK TIMING ADJUSTMENT CIRCUIT

[75] Inventors: Chi Sun Lai, Lake Zurich; Philip D. Gunderson, Arlington Heights, both of Ill.

[73] Assignee: Motorola, Inc., Schaumburg, Ill.

[21] Appl. No.: 537,726

[22] Filed: Dec. 31, 1974

[51] Int. Cl.² .............................................. F02P 5/04
[52] U.S. Cl. .............................. 123/117 R; 123/148 E
[58] Field of Search .......... 123/32 EA, 117 R, 148 E, 123/117 D, 146.5 A

[56] References Cited

U.S. PATENT DOCUMENTS

| | | | |
|---|---|---|---|
| 3,356,082 | 12/1967 | Jukes | 123/117 R |
| 3,559,629 | 2/1971 | Savvignet | 123/148 E |
| 3,559,629 | 2/1971 | Savvignet | 123/148 |
| 3,626,910 | 12/1971 | Poosche | 123/148 E |
| 3,783,850 | 1/1974 | Habert | 123/117 R |
| 3,823,696 | 7/1974 | Mutschler et al. | 123/32 EA |
| 3,861,369 | 1/1975 | Canup | 123/148 E |
| 3,881,458 | 5/1975 | Roozenbeek et al. | 123/148 E |
| 3,882,835 | 5/1975 | Randriamanentena | 123/117 R |
| 3,888,220 | 6/1975 | Bigalke et al. | 123/146.5 A |
| 3,890,944 | 6/1975 | Werner et al. | 123/146.5 A |
| 3,910,243 | 10/1975 | Gau et al. | 123/117 R |

Primary Examiner—Charles J. Myhre
Assistant Examiner—Craig R. Feinberg
Attorney, Agent, or Firm—James W. Gillman; Donald J. Lisa; Phillip H. Melamed

[57] ABSTRACT

An electronically adjustable spark timing signal is provided for an internal combustion engine to be used in conjunction with a breakerless constant percent dwell output electronic ignition system. A monostable multivibrator circuit uses two constant current sources, one of which is adjustable, to produce an electrical signal the pulse width of which, under static conditions, is representative of the predetermined amount of desired advance or retardation required for efficient engine operation at all speeds, the pulse width of the output signal also varies as a function of engine speed and provides automatic dynamic advance with increasing speeds. This electronic timing adjustment signal is then combined, in a delay circuit, with the digital output of a constant percent dwell circuit to provide an adjusted spark timing signal which controls the operation of the ignition coil.

12 Claims, 2 Drawing Figures

ELECTRONIC SPARK TIMING ADJUSTMENT CIRCUIT

BACKGROUND OF THE INVENTION

In an internal combustion engine using spark ignition of a fuel and air mixture, the proper timing of the spark in the compression cycle has been a continuing problem. There are several variables which influence the timing in a given engine at any given instant. Primary among these are the speed of the engine and the load on the engine. Conventionally, these two factors are dynamically compensated for by various forms of centrifugal and vacuum adjustments. Also needed, however, is an adjustment of the static timing reference point, which in ignition systems with breaker points is accomplished by a mechanical rotation of the entire distributor on the spark timing shaft. This mechanical adjustment is done under static conditions. With the advent of breakerless distributors, the conventional means of adjusting timing, i.e. by rotating the distributor relative to the distributor shaft failed to provide an accurate enough means for statically adjusting timing. With electronic ignition systems a precise timing adjustment is required. Not only does the present system provide for such a static adjustment, but simultaneously provides an electronic dynamic timing adjust signal.

SUMMARY OF THE INVENTION

It is, therefore, an object of the present invention to provide an improved means for electronically adjusting ignition spark timing in an all electronic ignition system and for breakerless distributor systems.

It is a further object of the present invention to provide an electronic timing signal which is adjusted a predetermined fixed dwell angle for all engine speeds and which is simultaneously dynamically adjusted under varying engine speed conditions.

It is a particular object of this invention to utilize a signal the frequency of which is proportional to engine speed and from it to derive a new digital signal the pulse width of which is inversely proportional to engine speed (constant distributor angle). This signal is then combined with another derived signal, the frequency of which is proportional to engine speed, producing thereby an adjustable spark timing reference signal.

In the preferred embodiment of the present invention a sensor in the distributor, replacing the breaker point assembly, produces a signal having a frequency proportional to engine speed. This sensor signal is processed in a "fixed dwell" circuit which produces a signal having a pulse of predetermined width synchronized with the sensor signal. The same sensor signal is also coupled to a circuit controlled by two constant current sources, at least one, being adjustable, to produce a pulse the width of which varies inversely as the engine speed, and which is synchronized with the sensor signal. When this latter pulse is combined with the pulse from the "fixed dwell" circuit in a modified "and" gate, the result is a pulse with constant duration as measured in distributor degrees, and adjustable manually. This combined pulse is now used to control the "off" time in the ignition coil primary. Additional means is provided to further vary the pulse width of the output signal as a function of engine speed for dynamic advance. The present invention thus provides a way of replacing the conventional timing adjustment means of a distributor with an electronic circuit which statically and dynamically advances timing and which is simple and easily controlled.

DETAILED DESCRIPTION OF DRAWING

Figure 1:
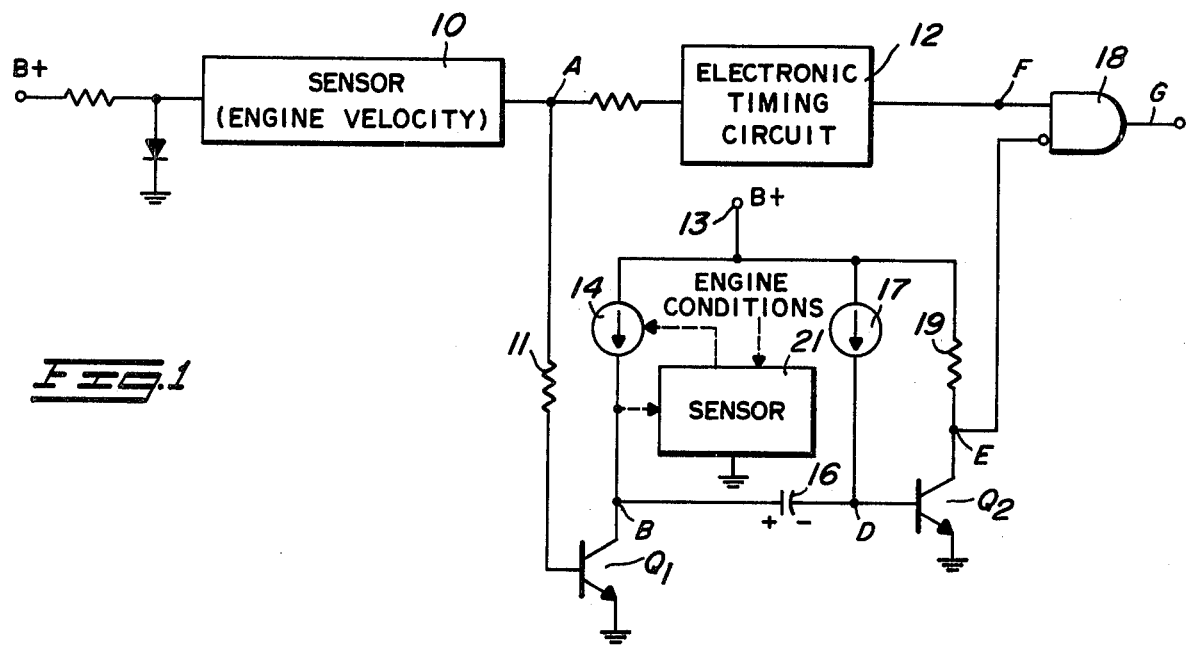
FIG. 1 is a schematic diagram of an embodiment of the invention showing in block form the "dwell" circuit and the sensors with which it is used.

In FIG. 1. of the drawing, a conventional sensor 10, such as a magnetic pickup, is located in a distributor (not shown) of an internal combustion engine (not shown). The sensor 10 generates an AC signal (A in FIG. 2) the frequency of which is proportional to engine speed and having a period or engine cycle "T". Sensor 10 supplies input signal A to an electronic dwell circuit 12 which is a conventional circuit as more fully described below. Sensor 10 also supplies input signal A to the base of Q1 through a resistor 11. The emitter of Q1 is connected to ground or a point of reference potential. A common B+ supply 13 is connected to one terminal of a first constant current source 14 of a conventional type, the second terminal of which is connected to the collector of Q1. The output signal at the collector of Q1 is shown as B in FIG. 2. The collector of Q1 is coupled to the base of Q2 by means of the timing capacitor 16. A second constant current source 17 has one terminal connected to the supply 13 and the other terminal connected to the base of Q2. Constant current source 17 is manually adjustable and is the equivalent of the mechanical timing adjustment. The signal at the base of Q2 is shown as D in FIG. 2. The emitter of Q2 is connected to the point of reference potential. The collector of Q2 is connected to the B+ supply 13 through a current limiting resistor 19. The signal at the collector of Q2 is shown as E in FIG. 2.

Figure 2:
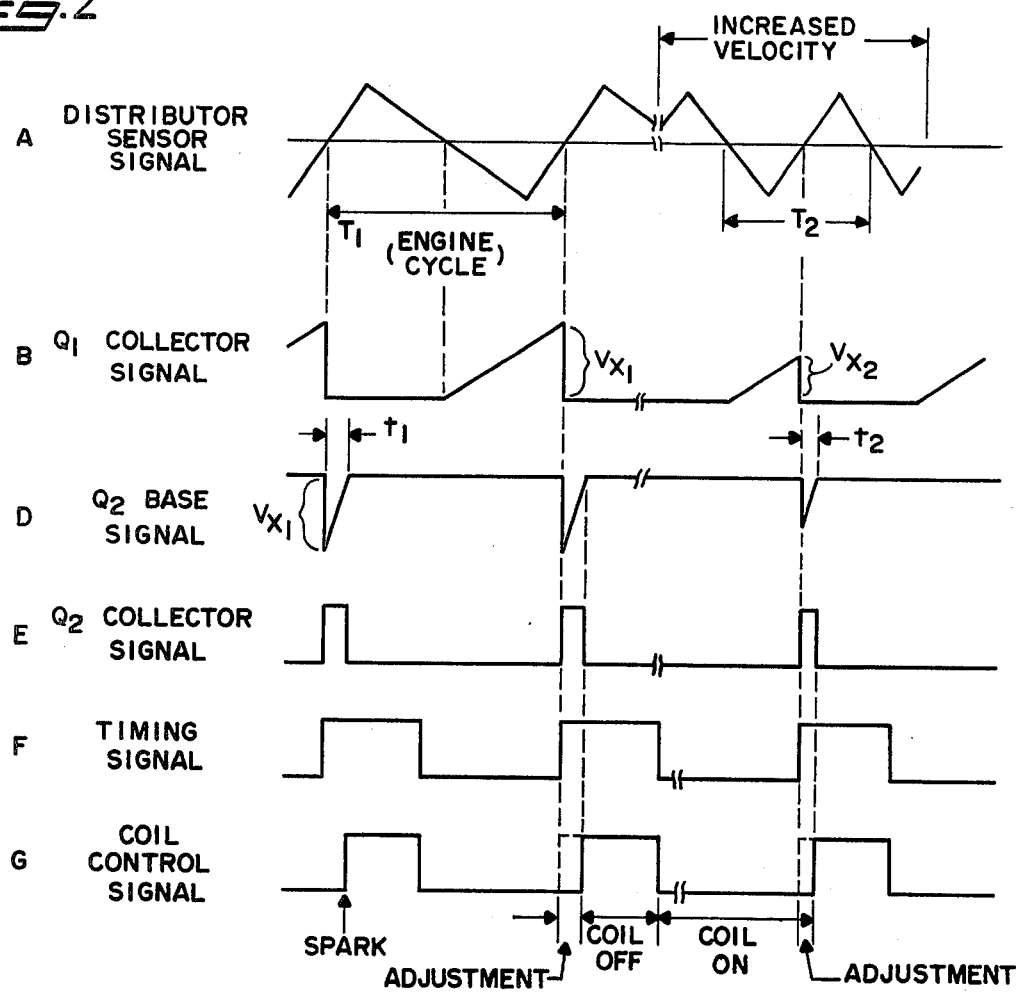
FIG. 2 is a graph of the wave forms at various critical points in the circuit of FIG. 1, showing phase and polarity relationships.

The output of the electronic dwell circuit is shown as F in FIG. 2. Signal E and signal F, being synchronized relative to each other, are fed to an "and" gate 18 and the resulting output of the gate G is coupled to the control circuit (not shown) for the ignition coil primary (not shown).

Shown dotted in on FIG. 1 is an optional second sensor 21 which reads the instantaneous value of $V_x$ at all times and controls the current source 14 to provide a voltage on the capacitor 16 at the end of the charge time such that at any given engine speed a predetermined advance is provided. Thus sensor 21 makes constant current source 14 a controllable current source for providing dynamic advance as a function of engine speed if desired. Also sensor 21 may be made responsive to any other engine parameter, such as manifold vacuum, which requires altering the timing adjustment. It should be noted that this sensor 21 could alternatively be connected to the second constant current source 17 and still provide dynamic timing adjustment.

The electronic circuit described above operates according to the present invention and in a manner to be described. The sensor signal A is processed in an electronic dwell circuit to produce signal F. This latter signal consists of pulses of predetermined duration each pulse being initiated by signal A reaching a predetermined reference voltage, i.e. the zero crossing point as shown in FIG. 2. But other kinds of electronic dwell circuits are known but the intent is to provide an adjustable timing circuit that is compatible with all such circuits. The pulse width of signal F may vary as a function of engine speed. For a typical electronic dwell circuit, see Gunderson co-pending U.S. application Ser. No. 449,185, filed Mar. 7, 1974, entitled "Zero Crossing Circuit for Electronic Ignition System" and assigned to the same assignee as the present application. Sensor signal A also biases transistor Q1 on and off. When A goes negative with respect to ground or point of reference potential, Q1 is turned off and the first constant current source 14 then begins linearly charging the timing capacitor 16 through a circuit including the base-emitter junction of Q2 which is forward biased "on" due to the positive charge supplied to terminal D of capacitor 16 by the second constant current source 17 on the previous cycle, as more fully described below. Signal B is the voltage waveform at the collector of Q1. The maximum voltage reached at B, $V_x$, is determined by the predetermined current I, which is produced by current source 14 and by the length of time that signal A is negative. $V_x$, therefore, is proportional to engine speed. When sensor signal A exceeds ground potential, Q1 is turned on and the collector of Q1 goes to ground. Since the voltage across the timing capacitor 16 cannot change instantaneously, when the one terminal B of the capacitor C goes to ground, the other terminal D of the capacitor is made more negative by an amount also equal to $V_x$. This movement of the potential level of point D places it at a negative potential which turns Q2 off. However, the second constant current source 17 immediately begins charging capacitor C through a circuit including the collector and emitter of Q1 which is conducting at this time. The potential at point D rises quickly until a level is reached which forward biases Q2 "on". Thereafter both Q1 and Q2 conduct until signal A goes negative, starting a new cycle. Accordingly, the "off" time of Q2 is determined by the initial charge placed on capacitor 16, which is a function of engine speed and $I_2$, the current produced by the adjustable second constant current source 17. This relationship is defined as follows:

$$V_x = \frac{I_1}{C} \times \frac{T}{2} = \frac{I_2 t}{C}$$

$$\therefore t = \frac{I_1 \times T}{2I_2}$$

$$\text{or } \frac{t}{T} = \frac{I_1}{2I_2}$$

where T is the engine period which varies as a function of engine speed and t is the "off" time of Q2. $I_1$ is a predetermined constant. For V8 engines the engine period T represents 45 distributor degrees. With t expressed in distributor degrees ($t/T \times 45°$), for any given engine speed the timing adjustment t/T is shown to depend only on the two current sources 14 and 17, being directly proportional to $I_1$ and inversely proportional to $I_2$. When these signals have been set, the spark timing will have been adjusted by a fixed value expressed in distributor degrees. The second constant current source 17, being adjustable, provides a final adjustment of the spark timing. It is understood that current source 14 may be adjustable instead of current source 17 with appropriate changes to the circuit as would be understood by one skilled in the art given applicants' disclosure.

Signal E is representative of the potential of the collector of Q2. When Q2 is on, the collector goes to ground. When Q2 is off, the collector goes high. Thus the output at the collector of Q2 is a pulse the width of which is controllable by varying $I_2$. Increase $I_2$ shortens the pulse width and decreased $I_2$ lengthens the pulse width. Similarly, increased engine speed results in a shortened pulse width of signal E and vice versa. As indicated in FIG. 2, at higher engine velocities ($T_2 < T_1$), $V_{x_2}$ is lower than $V_{x_1}$, $t_2$ is less than $t_1$, and signal E is narrower. Thus, the adjustment to G is less at the higher velocity.

Signal E is then fed to the NOT terminal of inhibitor 18, which is simply a modified AND circuit. Signal F is applied to the other terminal of gate 18. The output of gate 18 goes high only when signal F goes high provided signal E is NOT high. If signal E is high, then the gate 18 is prevented or inhibited from going high for the duration of the high output from E. When the output of gate 18 goes high, this is the signal which turns off the coil and causes a spark to appear at the spark plugs to fire the fuel-air mixture in the cylinder. Thus, the result is that the spark is delayed by a time equal to the predetermined duration of the pulse width of signal E.

A wider pulse width at point E retards timing, a narrower pulse width advances timing. Once $I_2$ and $I_1$ are fixed, the advance is fixed under static conditions, i.e., is a constant distributor angle for all speeds. However, if the pulse width of signal E is also controlled by the sensor 21 as previously described, the present invention provides a dynamic advance as well.

As described above the present invention has provided a means for electronically adjusting a spark timing signal which is suitable for use in a breakerless electronic ignition system. The present circuit thereby eliminates the need for mechanically setting a distributor for adjusting the spark timing. Indeed, the present invention is particularly suited for use in ignition systems where mechanical adjustment is either limited or not available. By providing dynamic advance the present invention eliminates the need for centrifugal weights and vacuum advance.

While a particular embodiment of the invention has been shown and described, the invention is not limited thereto since many modifications thereto may be made. It is therefore contemplated to cover by the present application any and all such modifications as fall within the true spirit and scope of the invention as described and claimed herein.

We claim:

1. An adjustable electronic spark timing circuit for use with the ignition system of an internal combustion engine, comprising:
   sensor means for providing an input signal, the frequency and period of which is proportional to the speed of an engine;
   first means for receiving said input signal and developing a first spark timing digital output signal having a series of pulses synchronized with the input signal with pulse widths equal to an adjustable constant proportion of the period of the input signal;
   second means for receiving said input signal and developing a second digital signal having a series of pulses synchronized with the input signal with predetermined pulse widths for a given engine condition, and circuit means for combining the first and second digital signals to provide an electronic spark timing signal having second signal pulses which are each adjusted in time by amounts equal to the pulse widths of the first digital signal.

2. An adjustable spark timing circuit as claimed in claim 1 further including third circuit means for varying the pulse widths of said first signal in response to any engine condition which requires a spark timing adjustment.

3. An adjustable spark timing circuit as claimed in claim 1 wherein said first means includes two constant current sources, at least one of which is adjustable, and a capacitor coupled between the two sources for producing said first output signal with pulse widths that are independent of the capacitance value of said capacitor and depend on the ratio of the currents produced by said current sources.

4. An adjustable electronic spark timing circuit for use with the ignition system of an internal combustion engine comprising:
   sensor means for providing an input signal the frequency of which is proportional to the speed of an engine having an ignition system,
   a first switch means coupled to the output of the sensor means, being switched on and off by the input signal, and having an output terminal,
   a second switch means, having input and output terminals,
   a capacitor having one terminal coupled to the output terminal of the first switch means and the other terminal coupled to the input terminal of the second switch means,
   first current source means coupled to the output terminal of the first switch and to the one terminal of the capacitor for charging the capacitor when the first switch means is off,
   the second switch means being switched off by the voltage on the other terminal of the capacitor reaching a predetermined voltage in response to the first switch means being switched on,
   second current source means coupled to the capacitor for charging the capacitor when the second switch means is off to control the off time of the second switch means thereby providing at the output terminal of the second switch means a first digital output signal having a series of pulses synchronized with the input signal with pulse widths which are representative of a predetermined timing adjustment for the ignition system of the engine,
   first circuit means for deriving from the output of the sensor means a second digital output signal having a series of pulses synchronized with the input signal with predetermined pulse widths for a given engine condition, and
   second circuit means for combining the first and second digital output signals to provide an electronic spark timing signal having pulses which are adjusted by an amount equal to the pulse widths of the first digital output signal for controlling the ignition system of the engine,
   at least one of said current sources being adjustable for providing a controllable spark timing adjustment.

5. An adjustable electronic spark timing circuit as claimed in claim 1 wherein the first and second switch means are each transistors.

6. The adjustable electronic spark timing circuit as claimed in claim 5 wherein the off time of the second transistor is determined by the length of time it takes the second controllable current source to charge the capacitor to a level to bias the second transistor on.

7. The adjustable electronic spark timing circuit as claimed in claim 1 further comprising third circuit means for controlling at least one of the current sources in response to any engine condition which requires a timing adjustment.

8. The adjustable electronic spark timing circuit as claimed in claim 1 wherein the timing adjustment is required by a change in manifold pressure.

9. The adjustable electronic spark timing circuit as claimed in claim 1 wherein the third circuit means comprises means for continuously sensing the potential on said capacitor and adjusting at least one current source to provide a predetermined timing adjustment required by the instantaneous engine speed.

10. The adjustable electronic spark timing circuit as claimed in claim 1 wherein the timing adjustment is required by a change of engine speed.

11. The adjustable electronic spark timing circuit of claim 10 wherein the second circuit means is an inhibitor gate having a NOT terminal, the first digital output signal being connected to the NOT terminal.

12. The adjustable electronic spark timing circuit as claimed in claim 10 wherein one of the current sources is constant and one is continuously controlled.

* * * * *